US008806571B2

(12) United States Patent
Kubota

(10) Patent No.: US 8,806,571 B2
(45) Date of Patent: *Aug. 12, 2014

(54) PROJECTOR PROJECTING PASSWORD

(75) Inventor: Shinji Kubota, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/587,555

(22) Filed: Aug. 16, 2012

(65) Prior Publication Data

US 2012/0311668 A1 Dec. 6, 2012

Related U.S. Application Data

(63) Continuation of application No. 12/801,623, filed on Jun. 17, 2010, now Pat. No. 8,272,035, which is a continuation of application No. 11/905,084, filed on Sep. 27, 2007, now Pat. No. 7,770,210, which is a continuation of application No. 10/228,334, filed on Aug. 27, 2002, now Pat. No. 7,447,906.

(30) Foreign Application Priority Data

Aug. 28, 2001 (JP) ................................ 2001-258118

(51) Int. Cl.
*G06F 7/04* (2006.01)
(52) U.S. Cl.
USPC .................................................. 726/2; 726/3
(58) Field of Classification Search
None
See application file for complete search history.

(56) References Cited

U.S. PATENT DOCUMENTS

| | | | |
|---|---|---|---|
| 4,430,526 A | | 2/1984 | Brown et al. |
| 4,599,489 A | | 7/1986 | Cargile |
| 4,800,590 A | | 1/1989 | Vaughan |
| 5,515,079 A | * | 5/1996 | Hauck ........................... 345/157 |
| 5,572,193 A | | 11/1996 | Flanders et al. |
| 5,758,079 A | | 5/1998 | Ludwig et al. |
| 5,768,510 A | | 6/1998 | Gish |
| 5,771,352 A | | 6/1998 | Nakamura et al. |
| 5,877,747 A | | 3/1999 | Kitao et al. |
| 6,141,000 A | | 10/2000 | Martin |

(Continued)

FOREIGN PATENT DOCUMENTS

| | | |
|---|---|---|
| EP | 0 656 581 A1 | 6/1995 |
| EP | 0 737 911 A1 | 10/1996 |

(Continued)

OTHER PUBLICATIONS

Richardson et al., "Virtual Network Computing", IEEE Internet Computing, vol. 2, No. 1, Jan./Feb. 1998.

(Continued)

*Primary Examiner* — Peter Poltorak
(74) *Attorney, Agent, or Firm* — Oliff PLC

(57) ABSTRACT

A projector system of the present invention includes a projector 10 and a personal computer PC as an information terminal, which communicate with each other via a network connection. The projector 10 generates a password required for establishment of the network connection and projects the password on a screen SC. A user of the personal computer PC inputs the password projected on the screen SC. The password is used for authentication of the network connection between the projector 10 and the personal computer PC and cipher communication therebetween. This arrangement of the present invention enhances the convenience of the projector that is capable of establishing a network connection with the information terminal, while ensuring secrecy of communicating data.

25 Claims, 3 Drawing Sheets

(56) References Cited

U.S. PATENT DOCUMENTS

| | | | |
|---|---|---|---|
| 6,148,406 | A | 11/2000 | Weisz et al. |
| 6,169,976 | B1 | 1/2001 | Colosso |
| 6,198,542 | B1 | 3/2001 | Tabata |
| 6,345,294 | B1 | 2/2002 | O'Toole et al. |
| 6,417,933 | B1 | 7/2002 | Szurkowski |
| 6,493,467 | B1 | 12/2002 | Okuda et al. |
| 6,642,918 | B2 | 11/2003 | Uchida et al. |
| 6,670,603 | B2 | 12/2003 | Shimada et al. |
| 6,735,616 | B1 * | 5/2004 | Thompson et al. ........... 709/204 |
| 6,760,749 | B1 | 7/2004 | Dunlap et al. |
| 6,783,252 | B1 | 8/2004 | Cambron |
| 6,828,986 | B2 | 12/2004 | Sakashita et al. |
| 6,830,340 | B2 | 12/2004 | Olson et al. |
| 6,904,451 | B1 | 6/2005 | Orfitelli et al. |
| 6,904,526 | B1 | 6/2005 | Hongwei |
| 6,928,166 | B2 | 8/2005 | Yoshiazawa |
| 6,957,232 | B2 | 10/2005 | Hoeye et al. |
| 7,016,058 | B1 | 3/2006 | Tabata |
| 7,016,935 | B2 | 3/2006 | Lee et al. |
| 7,018,043 | B2 | 3/2006 | Castaldi et al. |
| 7,047,088 | B2 | 5/2006 | Nakamura et al. |
| 7,139,248 | B2 | 11/2006 | Murai et al. |
| 7,191,214 | B2 | 3/2007 | Watanabe |
| 7,254,418 | B2 | 8/2007 | Iwasaki |
| 7,293,071 | B2 | 11/2007 | Sato et al. |
| 7,397,476 | B2 | 7/2008 | Akaiwa et al. |
| 7,403,510 | B1 | 7/2008 | Miyake |
| 7,447,906 | B2 | 11/2008 | Kubota |
| 7,486,254 | B2 | 2/2009 | Suzuki et al. |
| 7,647,555 | B1 | 1/2010 | Wilcox et al. |
| 7,770,210 | B2 | 8/2010 | Kubota |
| 7,782,330 | B2 | 8/2010 | Akaiwa et al. |
| 7,797,430 | B2 | 9/2010 | Ichieda |
| 7,965,284 | B2 | 6/2011 | Akaiwa et al. |
| 2001/0003479 | A1 | 6/2001 | Fujiwara |
| 2001/0017630 | A1 | 8/2001 | Sakashita et al. |
| 2001/0017712 | A1 | 8/2001 | Kasatani |
| 2001/0021980 | A1 | 9/2001 | Linden et al. |
| 2001/0037366 | A1 * | 11/2001 | Webb et al. ............... 709/204 |
| 2002/0015175 | A1 | 2/2002 | Katsuda |
| 2002/0026512 | A1 | 2/2002 | Nishimura et al. |
| 2002/0036652 | A1 | 3/2002 | Masumoto et al. |
| 2002/0083319 | A1 | 6/2002 | Ishiguro et al. |
| 2002/0090912 | A1 | 7/2002 | Cannon et al. |
| 2002/0106086 | A1 | 8/2002 | Kamiya et al. |
| 2002/0108108 | A1 | 8/2002 | Akaiwa et al. |
| 2002/0122075 | A1 | 9/2002 | Karasawa et al. |
| 2002/0131078 | A1 | 9/2002 | Tsukinokizawa |
| 2002/0133713 | A1 | 9/2002 | Fieschi et al. |
| 2002/0154210 | A1 * | 10/2002 | Ludwig et al. ............. 348/14.08 |
| 2002/0175915 | A1 | 11/2002 | Lichtfuss |
| 2002/0196378 | A1 * | 12/2002 | Slobodin et al. ............. 348/744 |
| 2003/0017846 | A1 | 1/2003 | Estevez et al. |
| 2003/0028637 | A1 | 2/2003 | Gross |
| 2003/0034999 | A1 | 2/2003 | Coughlin, III et al. |
| 2003/0048281 | A1 | 3/2003 | Murai et al. |
| 2003/0051139 | A1 | 3/2003 | Kubota |
| 2003/0072429 | A1 | 4/2003 | Slobodin et al. |
| 2003/0081561 | A1 | 5/2003 | Hsiao |
| 2003/0088793 | A1 | 5/2003 | Parry |
| 2003/0110217 | A1 | 6/2003 | Raju |
| 2003/0115263 | A1 | 6/2003 | Tran et al. |
| 2003/0191738 | A1 | 10/2003 | Hoeye et al. |
| 2003/0198347 | A1 | 10/2003 | Ribes et al. |
| 2003/0202661 | A1 | 10/2003 | Rodriguez et al. |
| 2003/0202679 | A1 | 10/2003 | Rodriguez |
| 2003/0204716 | A1 | 10/2003 | Rockwood et al. |
| 2003/0217293 | A1 | 11/2003 | Lee |
| 2003/0221011 | A1 | 11/2003 | Shitano |
| 2003/0225641 | A1 | 12/2003 | Gritzmacher et al. |
| 2003/0236895 | A1 | 12/2003 | Ohkubo et al. |
| 2004/0051734 | A1 | 3/2004 | Taniguchi et al. |
| 2004/0073795 | A1 | 4/2004 | Jablon |
| 2004/0109137 | A1 | 6/2004 | Bubie et al. |
| 2004/0117445 | A9 | 6/2004 | Lee et al. |
| 2004/0119945 | A1 | 6/2004 | Nakamura et al. |
| 2004/0123118 | A1 | 6/2004 | Dahan et al. |
| 2004/0130502 | A1 | 7/2004 | Sato et al. |
| 2004/0130568 | A1 | 7/2004 | Nagano et al. |
| 2004/0161277 | A1 | 8/2004 | Gassho et al. |
| 2004/0227900 | A1 | 11/2004 | Sato et al. |
| 2004/0236943 | A1 | 11/2004 | Edwards et al. |
| 2004/0249945 | A1 | 12/2004 | Tabuchi et al. |
| 2005/0012911 | A1 | 1/2005 | Cambron |
| 2005/0033805 | A1 | 2/2005 | Fujiyama et al. |
| 2005/0036509 | A1 | 2/2005 | Acharya et al. |
| 2005/0043973 | A1 | 2/2005 | Childers |
| 2005/0066047 | A1 | 3/2005 | Miyake et al. |
| 2005/0068506 | A1 | 3/2005 | Moriwaki et al. |
| 2005/0071430 | A1 | 3/2005 | Kobayashi et al. |
| 2005/0091359 | A1 | 4/2005 | Soin et al. |
| 2005/0097179 | A1 | 5/2005 | Orme |
| 2005/0102356 | A1 | 5/2005 | Manion et al. |
| 2005/0134523 | A1 | 6/2005 | Challener et al. |
| 2005/0163549 | A1 | 7/2005 | Shima et al. |
| 2005/0210390 | A1 | 9/2005 | Ono |
| 2005/0262223 | A1 | 11/2005 | Kimura |
| 2006/0170875 | A1 | 8/2006 | Falck et al. |
| 2006/0184497 | A1 | 8/2006 | Suzuki et al. |
| 2006/0250585 | A1 | 11/2006 | Anderson et al. |
| 2007/0005809 | A1 | 1/2007 | Kobayashi et al. |
| 2007/0286144 | A1 | 12/2007 | Miyake |
| 2008/0234843 | A1 | 9/2008 | Akaiwa et al. |
| 2010/0257586 | A1 | 10/2010 | Kubota |
| 2011/0210977 | A1 | 9/2011 | Akaiwa et al. |

FOREIGN PATENT DOCUMENTS

| | | |
|---|---|---|
| EP | 0 874 300 A2 | 10/1998 |
| EP | 1 059 766 A2 | 12/2000 |
| JP | A-06-197340 | 7/1994 |
| JP | A-07-200215 | 8/1995 |
| JP | A-07-336370 | 12/1995 |
| JP | A-09-503877 | 4/1997 |
| JP | A-09-198206 | 7/1997 |
| JP | A-09-205643 | 8/1997 |
| JP | A-10-200638 | 7/1998 |
| JP | A-10-289106 | 10/1998 |
| JP | A-11-098170 | 4/1999 |
| JP | A-11-319815 | 11/1999 |
| JP | B2-3017925 | 12/1999 |
| JP | A-2000-076028 | 3/2000 |
| JP | A-2000-089726 | 3/2000 |
| JP | A-2000-122829 | 4/2000 |
| JP | A-2000-122944 | 4/2000 |
| JP | A-2000-165577 | 6/2000 |
| JP | A-2000-222163 | 8/2000 |
| JP | A 2001-16664 | 1/2001 |
| JP | A-2001-092408 | 4/2001 |
| JP | A-2001-103078 | 4/2001 |
| JP | A-2001-144767 | 5/2001 |
| JP | A-2001-175602 | 6/2001 |
| JP | A-2001-202316 | 7/2001 |
| JP | A-2001-273259 | 10/2001 |
| JP | A 2001-312472 | 11/2001 |
| JP | A-2001-343959 | 12/2001 |
| JP | A-2001-358919 | 12/2001 |
| JP | A-2002-007091 | 1/2002 |
| JP | A-2002-007350 | 1/2002 |
| JP | A-2002-044096 | 2/2002 |
| JP | A-2002-057964 | 2/2002 |
| JP | A-2002-099473 | 4/2002 |
| JP | A-2003-006128 | 1/2003 |
| JP | A-2003-069923 | 3/2003 |
| JP | A-2003-110555 | 4/2003 |
| JP | A-2003-173117 | 6/2003 |
| JP | A-2003-173177 | 6/2003 |
| JP | A-2003-256063 | 9/2003 |
| JP | A-2003-333559 | 11/2003 |
| JP | A-2004-062477 | 2/2004 |
| JP | A-2005-084846 | 3/2005 |
| JP | A-2005-099574 | 4/2005 |
| JP | B2-4022683 | 10/2007 |

(56) References Cited

FOREIGN PATENT DOCUMENTS

| WO | WO 95/10823 | 4/1995 |
|---|---|---|
| WO | WO 99/37055 A1 | 7/1999 |
| WO | WO 01/92953 A1 | 12/2001 |

OTHER PUBLICATIONS

Oct. 16, 2009 Office Action issued in U.S. Appl. No. 11/905,084.
May 26, 2010 Notice of Allowance issued in U.S. Appl. No. 11/905,084.
Japanese Patent Office, Notification of Reason for Rejection dated Jul. 6, 2007 in Japanese Patent Application No. 11-360141.
Jan. 25, 2006 Office Action issued in U.S. Appl. No. 10/228,334.
Jul. 11, 2006 Office Action issued in U.S. Appl. No. 10/228,334.
Jul. 18, 2007 Advisory Action issued in U.S. Appl. No. 10/228,334.
Dec. 27, 2007 Office Action issued in U.S. Appl. No. 10/228,334.
Apr. 8, 2008 Office Action issued in U.S. Appl. No. 10/228,334.
Aug. 5, 2008 Notice of Allowance issued in U.S. Appl. No. 10/228,334.
Dec. 6, 2011 Office Action issued in Japanese Application No. 2009-216796 (with translation).
Aug. 31, 2011 Office Action issued in U.S. Appl. No. 12/493,809.
Nov. 25, 2010 Search Report issued in European Patent Application No. 10177908.0.
Nov. 26, 2010 Search Report issued in European Patent Application No. 10177910.6.
Nov. 26, 2010 Search Report issued in European Patent Application No. 10177911.4.
Office Action issued in U.S. Appl. No. 11/694,363; mailed Jan. 19, 2012.
Nov. 13, 2013 Office Action issued in U.S. Appl. No. 12/628,654.
Nov. 8, 2013 Office Action issued in U.S. Appl. No. 13/531,048.
Jul. 12, 2013 Office Action issued in U.S. Appl. No. 12/942,838.
Apr. 26, 2013 Office Action issued in U.S. Appl. No. 13/531,868.
Berger et al., "Using Symbiotic Displays to View Sensitive Information in Public," Mar. 2005, Third IEEE International Conference on Pervasive Computing and Communications, pp. 139-148.
Bloom, Jeffrey A., "Security and Rights Management in Digital Cinema," Jul. 2003, Proceedings of International Conference on Multimedia and Expo, vol. 1, pp. 621-624.
Apr. 16, 2012 Office Action issued in U.S. Appl. No. 12/942,838.
Apr. 8, 2008 Interview Summary issued in U.S. Appl. No. 10/228,334.
Aug. 9, 2010 Office Action issued in U.S. Appl. No. 11/032,134.
Jul. 27, 2009 Office Action issued in U.S. Appl. No. 11/032,134.
Mar. 16, 2009 Office Action issued in U.S. Appl. No. 11/032,134.
Mar. 3, 2010 Office Action issued in U.S. Appl. No. 11/032,134.
May 11, 2011 Office Action issued in U.S. Appl. No. 12/942,838.
May 2, 2007 Office Action issued in U.S. Appl. No. 10/228,334.
Nov. 9, 2006 Office Action issued in U.S. Appl. No. 10/228,334.
Oct. 19, 2011 Office Action issued in U.S. Appl. No. 12/942,838.
Sep. 2, 2008 Office Action issued in U.S. Appl. No. 11/032,134.
May 9, 2013 Office Action issued in U.S. Appl. No. 12/628,654.
U.S. Appl. No. 12/942,838 in the name of Kubota filed Nov. 19, 2010.
U.S. Appl. No. 13/531,868 in the name of Kubota filed Jun. 25, 2012.
U.S. Appl. No. 12/628,654 in the name of Sato et al. filed Dec. 1, 2009.
U.S. Appl. No. 13/618,130 in the name of Fujimori filed Sep. 14, 2012.
U.S. Appl. No. 13/531,048 in the name of Sato et al. filed Jun. 22, 2012.
Nov. 29, 2013 Office Action issued in U.S. Appl. No. 13/618,130.
May 19, 2014 Office Action issued in U.S. Appl. No. 13/618,130.
Mar. 26, 2014 Notice of Allowance issued in U.S. Appl. No. 13/531,048.
Mar. 31, 2014 Notice of Allowance issued in U.S. Appl. No. 12/628,654.

* cited by examiner

PROJECTOR PROJECTING PASSWORD

This is a Continuation of application Ser. No. 12/801,623 filed Jun. 17, 2010, which issued as U.S. Pat. No. 8,272,035, which is a Continuation of application Ser. No. 11/905,084 filed Sep. 27, 2007, which issued as U.S. Pat. No. 7,770,210, which is a Continuation of application Ser. No. 10/228,334 filed Aug. 27, 2002, which issued as U.S. Pat. No. 7,447,906 and claims priority to JP 2001-258118, filed Aug. 28, 2001. The disclosure of the prior applications is hereby incorporated by reference herein in their entirety.

BACKGROUND OF THE INVENTION

1. Field of the Invention

The present invention relates to a projector that projects a password.

2. Description of the Related Art

Data projectors have become popular to enlarge and project the contents of an on-screen display of an information terminal, such as a personal computer. The projector may establish a network connection with the information terminal via cable communication or via wireless communication. A password is generally required for establishment of the network connection.

Cipher communication is adopted to assure security and prevent illegal connection and interception of data in a projector that projects image data received from an information terminal connecting with the projector via wireless communication. For example, WEP (Wired Equivalent Privacy) technique is applied for cipher communication. In the WEP-based cipher communication, both a data transmitter side and a data receiver side input a common password. The common password is used for authentication of the connection and for encoding and decoding of communicating data.

For size reduction and good portability, the projector is typically not provided with a keyboard. A remote control or buttons on the projector are accordingly used for input of required data into the projector. Input of a password into the projector is accordingly rather time- and labor-consuming. In order to simplify a password input operation, one applicable technique causes the projector to generate a password. There is, however, difficulty in accurately notifying the user of the information terminal of the password. This problem is not restricted to input of the password for cipher communication but is commonly found in the case of requirement of a password for establishing communication between the information terminal and the projector.

SUMMARY OF THE INVENTION

The object of the present invention is thus to enhance the convenience of a projector that is capable of establishing a network connection with an information terminal while ensuring secrecy of communicating data.

In order to attain at least part of the above and the other related objects, the present invention is directed to a projector that is capable of establishing network connection with an information terminal, which supplies image data to be projected. The projector includes: a password generation module that generates a password to be input into the information terminal for establishment of the network connection; and a password projection module that projects the password.

The network connection of the projector of the present invention and an information terminal constructs a projector system. In the process of establishing the network connection between the projector and the information terminal, the projector carries out authentication with the password and identifies the legitimate connection. The information terminal is generally provided with a keyboard, which facilitates input of the password, compared with the projector.

The projector of the present invention may utilize a random digit to generate the password. The password is input at the information terminal including the keyboard. This arrangement does not require manual input of the password at the projector, thus enhancing the convenience of the projector system. The generated password is projected and displayed on a screen or the like. The user of the information terminal is thus accurately informed of the password and can input the correct password into the information terminal.

For the security, the password is generally not open to the public. The projector of the present invention is typically used in a limited space like a conference room. There is accordingly no fear of leaking the password to general public. This arrangement thus effectively prevents external illegal connections and ensures secrecy of communicating data.

In accordance with one preferable application of the invention, the network connection represents a connection via wireless cipher communication, and the password generation module generates the password used for the wireless cipher communication. The projector further has a cipher communication module that uses the password for the wireless cipher communication with the information terminal.

Wireless communication, especially wireless cipher communication may be applied for the network connection. This application of the invention generates the password used for cipher communication (an encoding key and a decoding key). A common password may be used in both of the projector and the information terminal, or alternatively different passwords may be used. In the former case, another information terminal located in the vicinity of the projector or the information terminal that supplies data may also be involved in the network connection by required settings including the password to fetch data. In the latter case, another information terminal is informed of only the encoding key or a password for establishing the network connection and can thus not decode the fetched data.

In the projector of the above application, it is preferable that the password generation module updates the password after establishment of the network connection to generate an updated password, and that the cipher communication module uses the updated password for the wireless cipher communication with the information terminal.

The updated password may be generated periodically or for each packet in the case of packet communication. This arrangement further heightens the secrecy of communicating data.

In one preferable embodiment of the projector of the invention, the password generation module generates a random password at each time of power supply to the projector.

In this embodiment, the password is generated at random at each time of power supply. Since one password is not continually used, this arrangement ensures secrecy of communicating data.

In accordance with another preferable application of the present invention, the projector further has a generation instruction module that is operated by a user to give an instruction for generating the password. The password generation module generates the password in response to the instruction.

In this application, the password is generated in response to intention of a user of the projector. Namely the password is generated according to the requirement to ensure secrecy of communicating data.

In accordance with still another preferable application of the invention, the projector further has a specification module that is operated by a user to specify a projection form of the password.

The projection form includes the projected and displayed position of the password on the screen and the character size. The projection form may be arbitrarily specified according to the area of the conference room where the projector is installed, the size of the screen, and the setting conditions.

In the projector of the present invention, it is preferable that the password projection module stops projection of the password when the network connection is established.

In this arrangement, establishment of communication is confirmed by projection or non-projection of the password. The projection of the password may be ceased after elapse of a preset time period as well as at the time of establishment of the network connection. This restricts the projection time of the password and thus heightens the secrecy of the password.

There are a diversity of applications of the present invention other than the projector described above. The possible applications include a projection method, a computer program for actualizing the projection method, a recording medium in which the computer program is recorded, and a data signal that includes the computer program and is embodied in a carrier wave. The variety of additional arrangements described above may be adopted in the respective applications.

The technique of the present invention may be actualized by a computer program or a recording medium in which the computer program is recorded. The computer program may be a whole program for driving the projector or a partial program for exerting the functions of the present invention. Typical examples of the recording medium include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
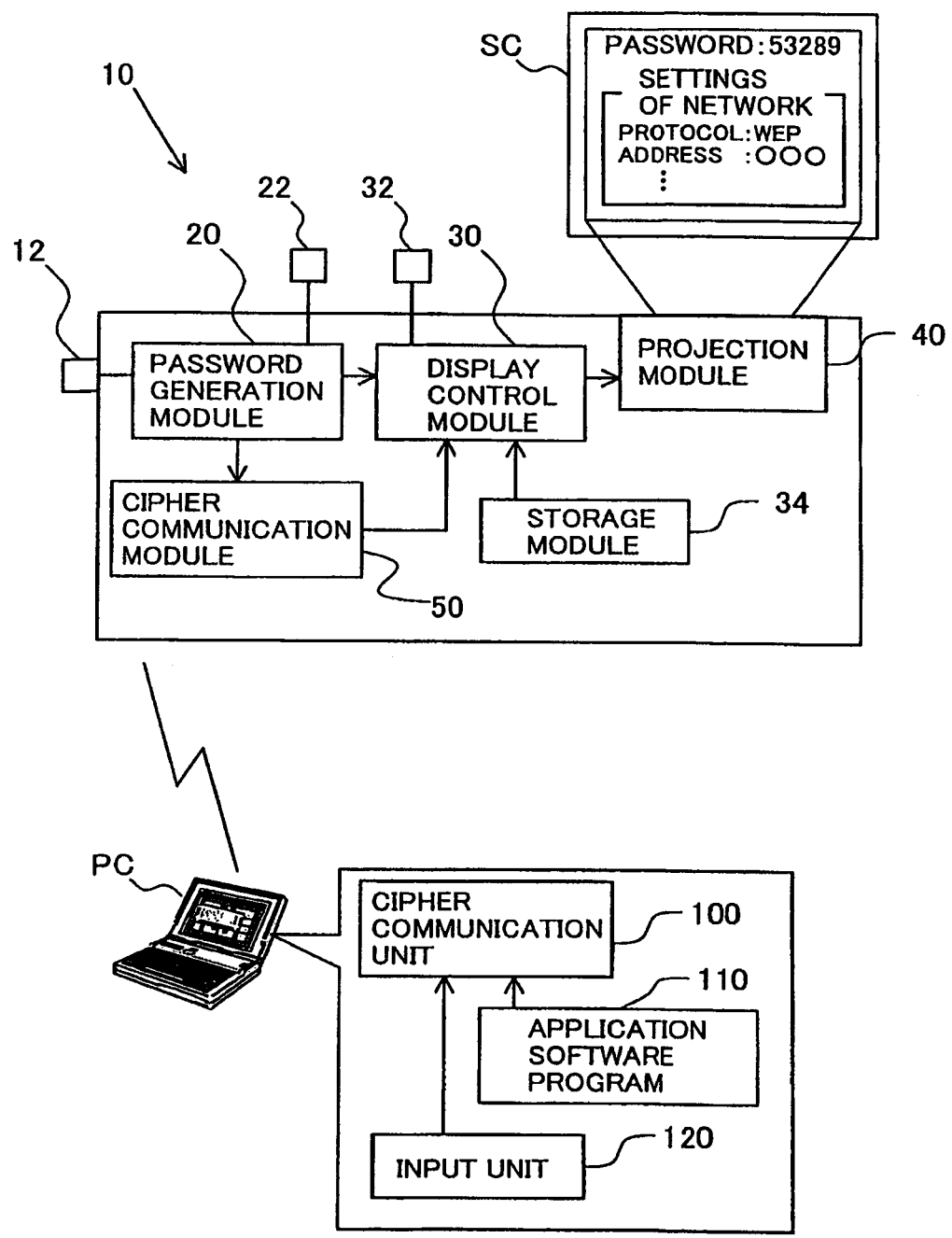
FIG. 1 schematically illustrates the construction of a projector system including a projector in a first embodiment of the present invention.

Some modes of carrying out the present invention are described below as preferred embodiments in the following sequence:
A. Construction of Projector System
B. Network Connection
C. Second Embodiment
D. Modifications A. Construction of Projector System FIG. 1 schematically illustrates the construction of a projector system including a projector 10 in a first embodiment of the present invention. The projector system of the embodiment includes the projector 10 and a personal computer PC, which establish a network connection via wireless communication. A plurality of personal computers may be connected to the projector 10 in this projector system. Another information terminal may replace the personal computer PC. The projector system is utilized in a limited space, such as a conference room or an auditorium.

The projector 10 is a data projector that projects data received from the personal computer PC on a screen SC. The projector 10 and the personal computer PC make cipher communication. In the arrangement of this embodiment, an identical password is set in both the projector 10 and the personal computer PC. This password is used for authentication of a network connection, encoding, and decoding.

The projector 10 includes a power switch 12, a password generation module 20, a password generation instruction module 22, a display control module 30, a display specification module 32, a projection module 40, and a cipher communication module 50. The projector 10 also has a storage module 34 to store setting information for a network connection, such as a protocol and an address.

The password generation module 20 generates a password, which is commonly used in the cipher communication module 50 of the projector 10 and a cipher communication unit 100 of the personal computer PC, in response to an ON operation of the power switch 12. The technique of this embodiment uses a random digit for generation of the password. The password is accordingly generated at random at every time of power supply to the projector 10. The password generation module 20 is connected to the password generation instruction module 22 and may generate the password in response to a user's instruction. The password generation instruction module 22 gives an instruction of generating the password to the password generation module 20 in response to the user's operation. This arrangement effectively prevents illegal connection to the network and interception of communication data.

The display control module 30 makes the data input from the personal computer PC via the cipher communication module 50 subjected to a diversity of image processing and generates an image, which is to be projected by the projection module 40. As illustrated, the password generated by the password generation module 20 and the setting information for the network connection may also be projected on the screen SC. The display specification module 32 is connected to the display control module 30 to arbitrarily specify the display position of the password on the screen SC and the character size in response to the user's operation, for easy view of the projected password.

The projection module 40 includes a light source and a projection optical system (not shown) and projects the image generated by the display control module 30 and the password on the screen SC.

The cipher communication module 50 utilizes the password generated by the password generation module 20 for authentication of a network connection. The cipher communication module 50 also decodes encoded data sent from the personal computer PC and supplies the decoded data to the display control module 30.

The personal computer PC includes a cipher communication unit 100, an application software program 110, and an input unit 120. The user of the personal computer PC inputs the password projected on the screen SC and setting information for the network connection through operations of a keyboard and a mouse (not shown). The cipher communication unit 100 utilizes the input password to establish the network connection with the projector 10, encodes image data of the application software program 110 with the password, and transmits the encoded image data to the projector 10.

B. Network Connection

Figure 2:
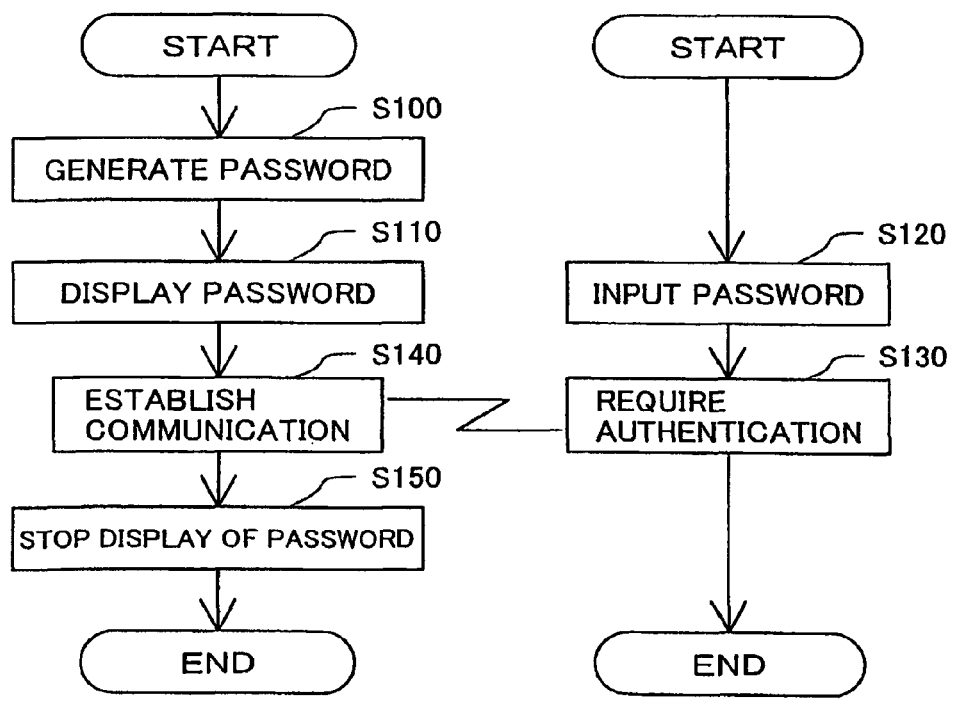
FIG. 2 is a flowchart showing a process of establishing a network connection between the projector and a personal computer PC.

FIG. 2 is a flowchart showing a process of establishing a network connection between the projector 10 and the personal computer PC. The left flow shows a series of processing at the projector 10, whereas the right flow shows a series of processing at the personal computer PC. The projector 10 generates a password (step S100). The password is generated in response to power supply (that is, an ON operation of the power switch 12) or by an operation of the password generation instruction module 22. The projector 10 projects and displays the generated password on the screen SC (step S110). The setting information for the network connection may be projected together with the password. The user of the personal computer PC inputs the password projected on the screen SC through an operation of the keyboard (step S120). In order to establish communication with the projector 10, the user requires authentication of the network connection with the input password (step S130). The projector 10 authenticates the input password in response to a requirement of authentication from the personal computer PC. When connection is established with the personal computer PC (step S140), the projector 10 stops the projection and display of the password on the screen SC (step S150). Establishment of communication is confirmed by the ceased projection of the password. Projection of the password may be ceased after a predetermined time has passed since start of the projection. This arrangement heightens the secrecy of the password. Establishment of the network connection allows cipher communication between the projector 10 and the personal computer PC.

In the projector 10 of the first embodiment, the password generation module 20 generates a password. The user of the projector 10 is accordingly not required to input the password into the projector 10. This arrangement enhances the convenience of the projector system. The generated password is projected on the screen SC, so that the user of the personal computer PC is accurately informed of the password to be input into the personal computer PC.

For the security, the password is generally not open to the public. The projector 10 of the embodiment is used in a limited space like a conference room. There is accordingly no fear of leaking the password to general public. The arrangement of the embodiment thus effectively prevents external illegal connections and ensures secrecy of communicating data.

In the arrangement of this embodiment, a common password is used in both the projector 10 and the personal computer PC. Another nearby information terminal can receive data from the personal computer PC after establishing a similar network connection with the personal computer PC.

C. Second Embodiment

Figure 3:
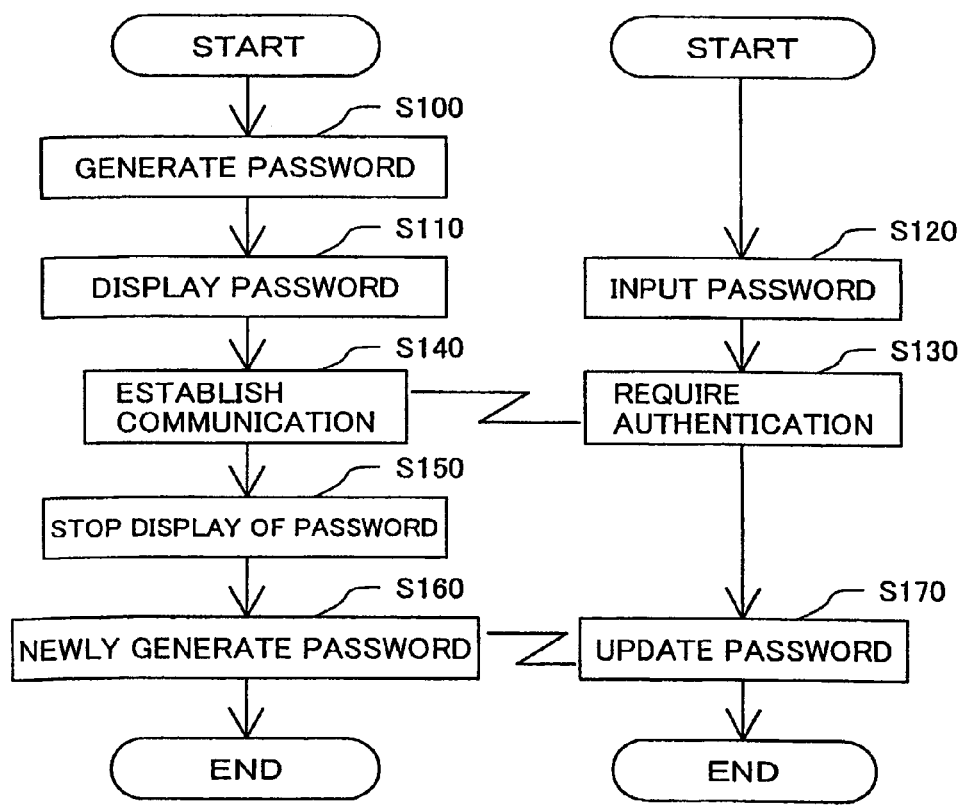
FIG. 3 is a flowchart showing a process of establishing a network connection between the projector and the personal computer PC in a second embodiment of the present invention.

FIG. 3 is a flowchart showing a process of establishing a network connection between the projector 10 and the personal computer PC in a second embodiment of the present invention. The processing of steps S100 through S150 is identical with that of the first embodiment, and the construction of the projector system is also identical with that of the first embodiment. In the arrangement of the second embodiment, after establishment of communication between the projector 10 and the personal computer PC, the projector 10 newly generates a password (step S160). Generation of the new password may be executed automatically after establishment of communication or in response to the user's operation of the password generation instruction module 22. Since the communication has already been established between the projector 10 and the personal computer PC, the newly generated password is not projected on the screen SC but is transmitted to the personal computer PC. The personal computer PC receives the transmitted password and updates the password (step S170). Generation of the new password and updating may be carried out periodically or for each transmitted packet. The projector 10 and the personal computer PC make cipher communication with the updated password.

The technique of the second embodiment does not project the newly generated password on the screen SC. This arrangement prevents any third person from being informed of the updated password, thus ensuring high secrecy of communicating data.

D. Modifications

The above embodiments and their modifications are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

D1. Modified Example 1

The above embodiment uses a common password for both coding and encoding of data in cipher communication. Different passwords may alternatively be used for coding and encoding of data, respectively. In the latter case, the password generation module 20 of the projector 10 generates a password corresponding to an encoding key used in the personal computer PC and another password corresponding to a decoding key used in the projector 10. The password corresponding to the encoding key is projected on the screen SC. The user inputs the projected password into the personal computer PC.

This arrangement informs only the projector 10 of the password for decoding the data encoded by the personal computer PC, thus effectively preventing interception of data by any other device.

D2. Modified Example 2

The above embodiment regards wireless cipher communication between the projector 10 and the personal computer PC. The technique of the present invention is also applicable for cable communication.

D3. Modified Example 3

The above embodiment regards the image display system including the projector (projector system). The technique of the present invention is also applicable to other image display systems where an image display device and an information terminal establish a network connection.

The scope and spirit of the present invention are indicated by the appended claims, rather than by the foregoing description.

What is claimed is:

1. A projector that is capable of establishing a network connection with an information terminal, the projector comprising:
   a display controller configured to generate a predetermined image including a password to be input into the information terminal for establishment of the network connection, and to generate an image corresponding to image data supplied by the information terminal; and
   a projection optical system configured to project the predetermined image including the password, and to project the image according to the image data supplied from the information terminal, after establishment of the network connection, onto a screen external to the projector.

2. The projector in accordance with claim 1, the projector further comprising:
   a password generator configured to generate the password.

3. The projector in accordance with claim 2, wherein the network connection represents a connection via wireless cipher communication, and
   the password generator generates the password used for the wireless cipher communication,
   the projector further comprising:
   a cipher communications controller configured to use the password for the wireless cipher communication with the information terminal.

4. The projector in accordance with claim 3, wherein the password generator updates the password after establishment of the network connection to generate an updated password, and
   the cipher communications controller uses the updated password for the wireless cipher communication with the information terminal.

5. The projector in accordance with claim 2, wherein the password generator generates a random password at each time of power supply to the projector.

6. The projector in accordance with claim 2, the projector further comprising:
   a generation instruction switch that is operated by a user to give an instruction for generating the password,
   wherein the password generator generates the password in response to the instruction.

7. The projector in accordance with claim 2, wherein the display controller and the projection optical system respectively generate and project an image different from the predetermined image after the network connection is established.

8. The projector in accordance with claim 7, wherein the password generator generates a password at each start up of the projector.

9. The projector in accordance with claim 1, the projector further comprising:
   a network connector configured to make connection with a network.

10. The projector in accordance with claim 1, the projector further comprising:
    a specification input that is operated by a user to specify a projection form of the password.

11. The projector in accordance with claim 1, wherein the projection optical system stops projection of the password substantially at the time the network connection is established.

12. The projector in accordance with claim 1, wherein:
    the display controller controls an appearance of the password projected by the projection optical system so as to ease the inputting of the password on the information terminal.

13. The projector in accordance with claim 12, wherein the display controller changes a display position of the password.

14. The projector in accordance with claim 12, wherein the display controller changes a character size of the password.

15. The projector in accordance with claim 1, wherein the predetermined image projected by the projection optical system includes setting information corresponding to the network connection.

16. The projector in accordance with claim 1, wherein the projection of the predetermined image including the password is stopped substantially at the time the network connection is established.

17. The projector in accordance with claim 1, wherein the password is displayed in a predetermined section of the predetermined image.

18. The projector in accordance with claim 17, wherein after establishment of the network connection, the password is no longer displayed in the predetermined section of the predetermined image.

19. A method implemented by a projector, the projector being capable of establishing a network connection with an information terminal, the method comprising the steps of:
    (a) generating a predetermined image including a password to be input into the information terminal for establishment of the network connection;
    (b) projecting, by the projector, the predetermined image including the password, onto a screen external to the projector; and
    (c) projecting, by the projector, an image corresponding to image data supplied from the information terminal after establishment of the network connection, onto the screen external to the projector.

20. The method according to claim 19, further comprising the steps of:
    updating the password after establishment of the network connection to generate an updated password; and
    communicating with the information terminal by using the updated password.

21. The method according to claim 19, further comprising the steps of:
    accepting an instruction for generating the password; and
    generating the password in response to the instruction.

22. The method according to claim 19, further comprising the steps of:
    establishing the network connection with the information terminal; and
    stopping projection of the password after the network connection is established.

23. A non-transitory computer readable recording storage medium in which a computer program used for driving a projector is recorded, the projector being capable of establishing a network connection with an information terminal, the computer program causing a computer to attain the functions of:
    projecting, by the projector, a password to be input into the information terminal for establishment of the network connection onto a screen external to the projector; and projecting, by the projector, an image according to image data supplied from the information terminal after establishment of the network connection, onto the screen external to the projector.

24. A projector that is capable of establishing a network connection with an information terminal, the projector comprising:
- a generation instruction input that is operated by a user to give an instruction for generating a password to be input into the information terminal for establishment of the network connection;
- a projection optical system that projects the password, and that projects an image according to image data supplied from the information terminal after establishment of the network connection, onto a screen external to the projector; and
- a password generator that generates the password in response to the instruction.

25. A projector that is capable of establishing a network connection with an information terminal, the projector comprising:
- a display controller that generates a predetermined image including a password to be input into the information terminal for establishment of the network connection, and that generates an image corresponding to image data supplied by the information terminal;
- a projection optical system that projects the predetermined image including the password, and that projects the image according to the image data supplied from the information terminal after establishment of the network connection, onto a screen external to the projector; and
- a password generator that updates the password, in the event that the network connection is established, to generate an updated password.

* * * * *